(12) United States Patent
Schulz et al.

(10) Patent No.: US 6,495,036 B1
(45) Date of Patent: Dec. 17, 2002

(54) DIFFUSER FOR OZONE DISINFECTION OF WATER

(76) Inventors: Christopher R. Schulz, 2795 E. Fair Pl., Aurora, CO (US) 80016; James A. Reilly, 7 Guinevere Cir., Shrewsbury, MA (US) 01545

( * ) Notice: Subject to any disclaimer, the term of this patent is extended or adjusted under 35 U.S.C. 154(b) by 0 days.

(21) Appl. No.: 09/756,495

(22) Filed: Jan. 8, 2001

(51) Int. Cl.[7] .................................................. C02F 1/78
(52) U.S. Cl. .................... 210/199; 210/205; 261/38; 261/74; 261/DIG. 42; 422/186.07
(58) Field of Search ........................... 210/150, 198.1, 210/199, 205; 261/19, 38, 74, 75, DIG. 42; 422/186.07

(56) References Cited

U.S. PATENT DOCUMENTS 5,032,292 A * 7/1991 Conrad
5,273,664 A 12/1993 Schulz ..................... 210/759
6,001,247 A 12/1999 Schulz ..................... 210/192
6,106,731 A * 8/2000 Hayes

\* cited by examiner

Primary Examiner—Betsey Morrison Hoey
(74) Attorney, Agent, or Firm—Alfred J. Mangels (57) ABSTRACT

A device for introducing ozone uniformly into water flowing through a conduit for disinfecting the water. An ozone-contacting vessel is provided and includes a downflow tube through which water is caused to flow. The downflow tube is positioned vertically within a diffusion chamber. Within the downflow tube are a plurality of layers of transversely extending porous elements that are in communication with a source of ozone to provide a relatively uniform distribution of fine ozone bubbles over the cross-sectional area of the downflow tube. The downflow tube can be J-shaped, to convey ozonated water into downstream ozone reaction cells to permit oxidation or disinfection of the water being treated. An outlet seal plate is provided at the J-tube outlet to prevent backflow into the J-tube upon shutdown of the contactor cell containing the J-tube.

14 Claims, 8 Drawing Sheets

DIFFUSER FOR OZONE DISINFECTION OF WATER

BACKGROUND OF THE INVENTION

1. Field of the Invention

The present invention relates to apparatus for disinfecting water by the direct introduction of gaseous ozone into the water. More particularly, the present invention relates to a water treatment apparatus in which gaseous ozone is introduced into a vertically disposed water conduit, such as by a plurality of porous diffuser elements positioned within the conduit or by direct injection.

2. Description of the Related Art

The notion of treating water with gaseous ozone for disinfection is well known. Various types of apparatus and methods have been devised to introduce and dissolve gaseous ozone into water for treatment of the water by providing retention chambers in which the ozone is introduced through mechanical mixers, injectors, porous diffusers, and packed columns. The primary purpose of each of those approaches is to transfer sufficient gaseous ozone to the water to be treated, in order to provide the required contact time of the ozone with the water so that the disinfection treatment is as thorough as possible.

Although there are several known approaches to accomplish the disinfection operation, even the more efficient of those processes, in terms of the efficiency of exposure of the water to ozone, include certain drawbacks. For example, although packed column technology provides transfer efficiencies of from about 80% to about 95%, there is little operational experience with such approaches, and, more significantly, there is a strong potential for high head losses as the result of build-up of scale on the column medium. Mechanical mixing, on the other hand, although capable of providing ozone transfer efficiencies in the range of from about 90% to about 98%, involves brief ozone-water contact times that might require retreatment for effective disinfection. Additionally, mechanical mixing also involves high operating cost because of the energy usage and the requirement for maintenance of the mechanical equipment.

Fine bubble diffuser contactors, another approach for effecting disinfection of water by the introduction of ozone, are quite widely used and provide ozone transfer efficiencies in the range of about 90% to about 95%. They operate effectively at low to medium ozone concentrations (<6% by wt.) when there is a sufficient volumetric ozone flow rate delivered to the ozone contactor to effectively distribute the ozone to the diffusers and provide adequate ozone-water mixing for homogenous ozone dissolution. However, at higher ozone concentrations (8 to 12% by wt.) and lower gas flow rates, which often result when oxygen feed gas systems and advanced technology ozone generators are employed, there is an increased risk of gas bubble channeling, with resultant inadequate contact between the ozone gas bubbles and the water being treated, which could cause incomplete disinfection of the water.

To overcome inefficient mixing conditions in fine bubble diffuser systems at higher ozone concentrations, the present inventor developed an improved ozone dissolution system, combining a sidestream venturi injection system with a specially designed downflow tube to convey the ozone-water mixture into an ozone contactor. The downflow tube can be installed within or adjacent to one or more diffusion chambers of the ozone contactor to increase the time of contact of the ozone with the water. Turbulent mixing conditions are provided by the sidestream venturi injection system, even at low plant flows or low ozone doses. Pressurized sidestream flows discharge into the downflow tube through one or more venturi injectors, which also pull ozone gas onto the sidestream flows under negative pressure. In addition, the vertically oriented downflow tube maximizes bubble hold-up, thereby increasing bubble contact time with the water and improving ozone mass transfer rates. An example of such a system is disclosed in U.S. Pat. No. 5,273,664, which issued on Dec. 28, 1993, and is entitled, "Apparatus and Method for Disinfection of Water by Ozone Injection." That patent discloses the combination of sidestream injection and injection within the downflow tube to introduce ozone into the water. However, some venturi injection systems also exhibit incomplete mixing.

There have been recent advances in ozone generation technology by several equipment suppliers, and it is now possible to generate ozone at concentrations as high as 15% by weight. However, there still exists a need to develop a cost-effective ozone contacting device that is fully compatible with those equipment advances, and that can be used effectively for primary disinfection of drinking water. In particular, the inactivation of Cryptosporidium requires higher ozone concentrations and longer contact times than for the inactivation of other microorganisms of interest (e.g., Giardia and viruses). Consequently, careful attention to ozone mass transfer and homogeneous, two-phase mixing considerations in the ozone contactor are of critical importance.

It is an object of the present invention to provide a simplified and efficient apparatus for introducing low volumetric flows and high concentrations of ozone into water, for maintaining longer and more turbulent ozone-water contact in order to provide more complete disinfection of water, for providing positive mixing action at a point downstream of the ozone introduction point, and for positive sealing against backflow when the apparatus is out of service.

SUMMARY OF THE INVENTION

Briefly stated, in accordance with one aspect of the present invention, apparatus is provided for introducing ozone into water for treatment for disinfection purposes. The apparatus includes a contactor vessel for receiving water to be treated, the vessel including a water inlet conduit for introducing untreated water into the vessel and a water outlet conduit for withdrawing treated water from the vessel. At least one diffusion chamber is provided within the contactor vessel and within which ozone is introduced into water to be treated, and at least one downflow tube having a longitudinal axis is positioned substantially vertically within the diffusion chamber. The downflow tube includes a water inlet and a water outlet, wherein the water outlet is positioned below the water inlet. An ozone distributor is positioned within the downflow tube between the downflow tube water inlet and the downflow tube water outlet. The ozone distributor is in communication with a source of ozone for introducing the ozone into the downflow tube. A check valve is positioned at the downflow tube water outlet for closing the outlet opening and preventing backflow of water into the outlet opening upon cessation for flow of untreated water into the downflow tube inlet.

DESCRIPTION OF THE PREFERRED EMBODIMENTS

Referring now to the drawings, and particularly to FIGS. 1 through 4 thereof, there is shown a portion of a water treatment system that includes a closed ozone contactor vessel 200 for treatment of drinking water or wastewater at high ozone concentrations and low volumetric gas flow rates. Vessel 200 is of generally rectangular cross section, in each of the longitudinal, transverse, and vertical directions. Typically, vessel 200 is made of concrete, although other types of materials can also be employed.

Vessel 200 includes a plurality of vertically-extending, J-shaped downflow tubes 202 that each include an interiorly-positioned fine-bubble ozone distributor. Porous diffuser elements are incorporated into ozone distributor 284 for introducing ozone gas in fine bubble form into the water that passes through the downflow tubes and through the contactor vessel. The disclosed arrangement overcomes the inefficient mixing conditions that exist in conventional fine-bubble diffuser systems at higher ozone concentrations by creating turbulent gas-liquid mixing conditions within the J-tubes, which increases ozone mass transfer rates, ozone residual formation, and the contact time available for disinfection—all at a lower cost than alternative dissolution systems.

Figure 1:
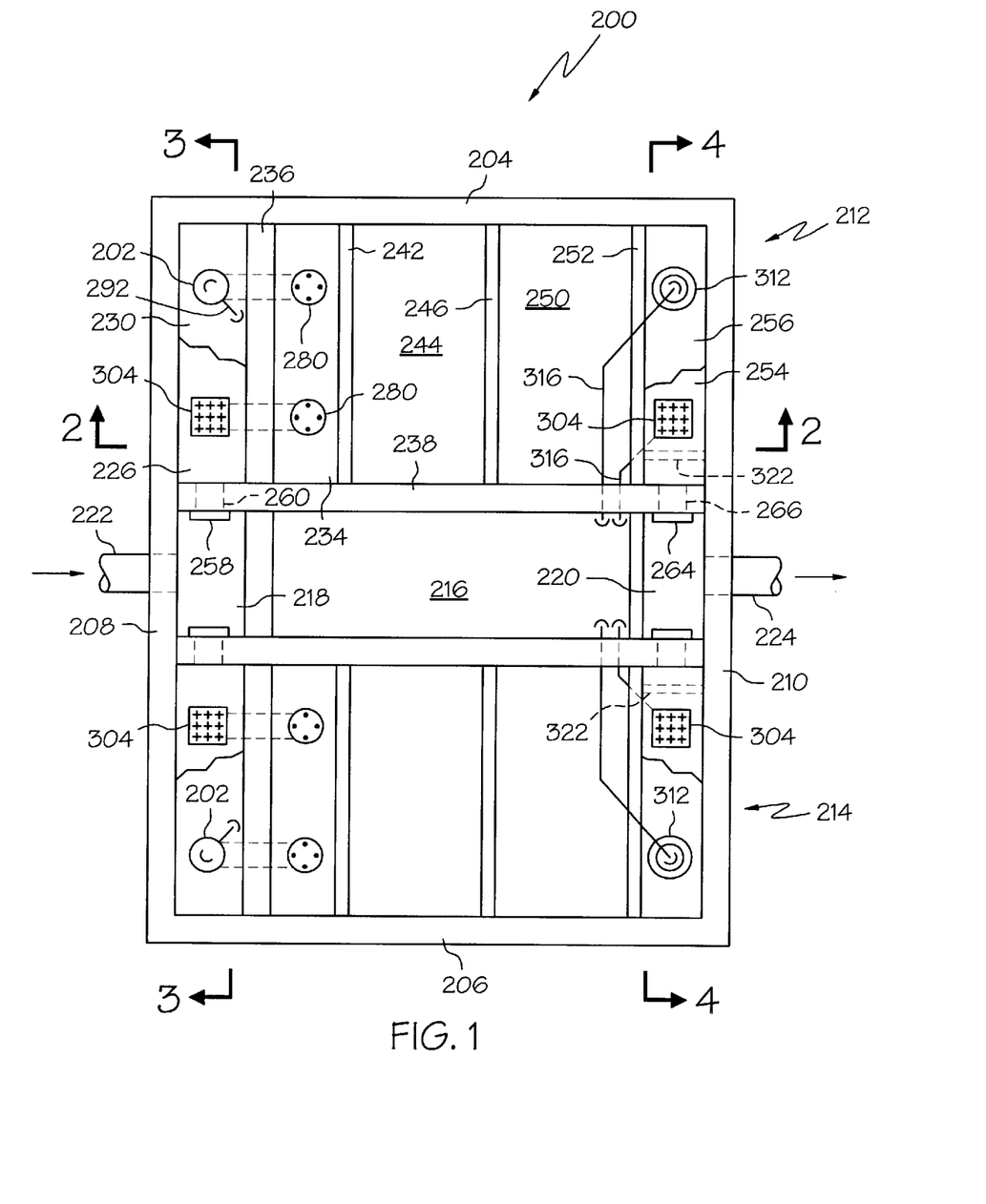
FIG. 1 is a top plan view of an embodiment of an ozone contactor vessel in accordance with the present invention and incorporating a J-shaped downflow tube that includes a multi-stage ozone distributor.

Vessel 200 is of generally rectangular configuration, both in plan and in elevation, and as best seen in the plan view of FIG. 1 it includes a pair of opposed side walls 204, 206 and a pair of opposed end walls 208, 210. The interior of vessel 200 includes two parallel ozone contactors 212 and 214 that are spaced from each other by an elongated, narrow contactor gallery 216, which serves for housing instrumentation, sample piping, and process piping for conveying and regulating the flow of ozone gas and ozone-quenching chemicals. Also positioned between contactors 212 and 214 are a water inlet distribution channel 218 and a water outlet collection channel 220. Water inlet distribution channel 218 is in communication with a water inlet pipe 222 for conveying untreated water to vessel 200. Water outlet collector channel 220 is in communication with a water outlet pipe 224 that conveys treated water from vessel 200 to a downstream treatment process or pumping station (not shown).

Each of ozone contactors 212 and 214 is of similar configuration and construction. Accordingly, it should be understood that the following description of first contactor 212 applies with equal effect to second contactor 214. And although the present description is based upon a total of two ozone contactors, it will be appreciated that the actual number of contactors can be different from two. The number will depend upon the flow rates and contact times necessary to achieve disinfection, and the ozone demand and decay rates of the water being treated. Further, although the ozone contactors are shown as having substantially the same volume, it is not essential that volumetric relationship be maintained, and it may be desirable in some instances to provide a larger contactor volume in the downstream stage of disinfection to allow additional contact time for disinfection after the initial ozone demand of the water is satisfied and an ozone residual is established in the first stage.

Figure 2:
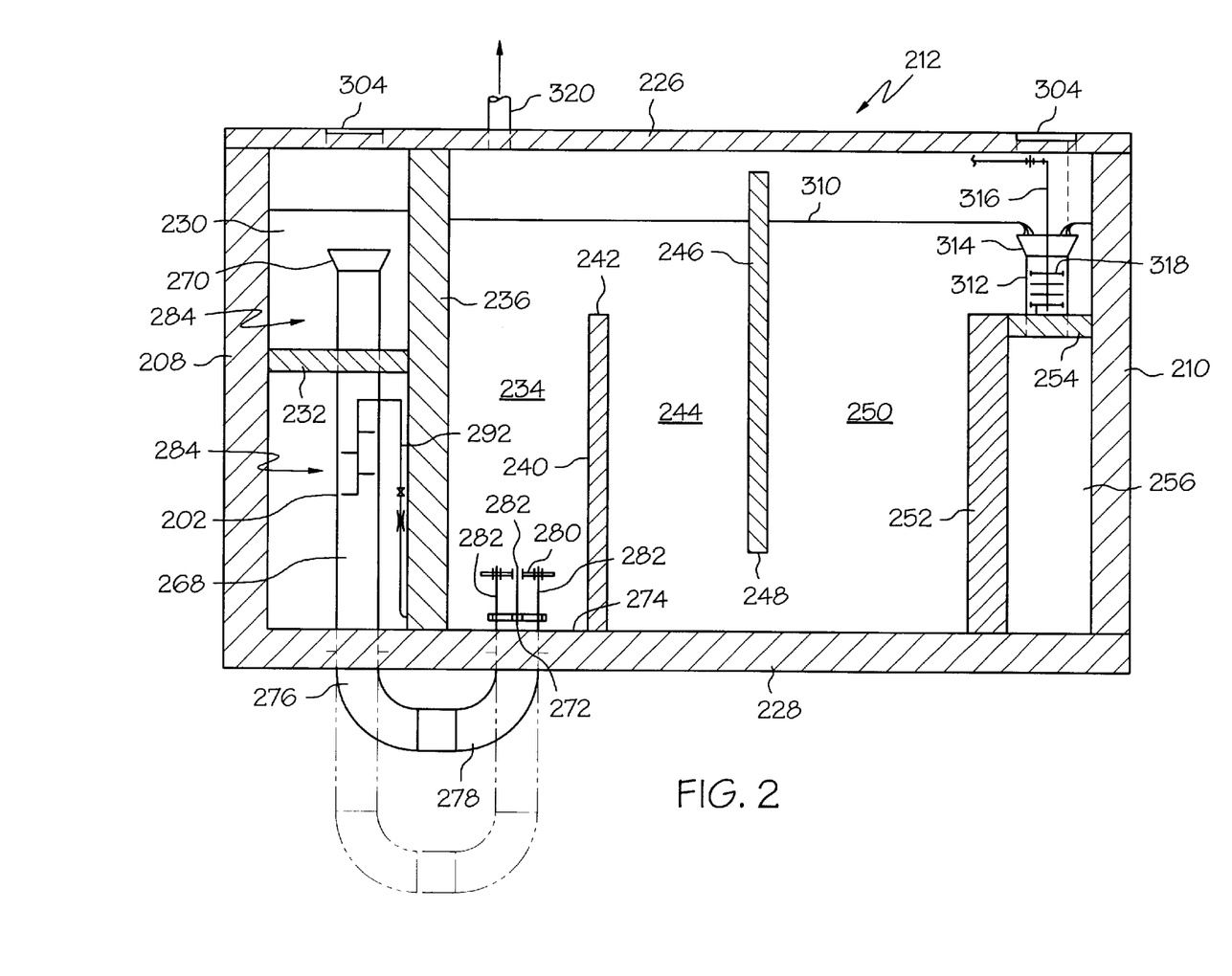
FIG. 2 is a cross-sectional view taken along the line 2—2 of FIG. 1.
Figure 3:
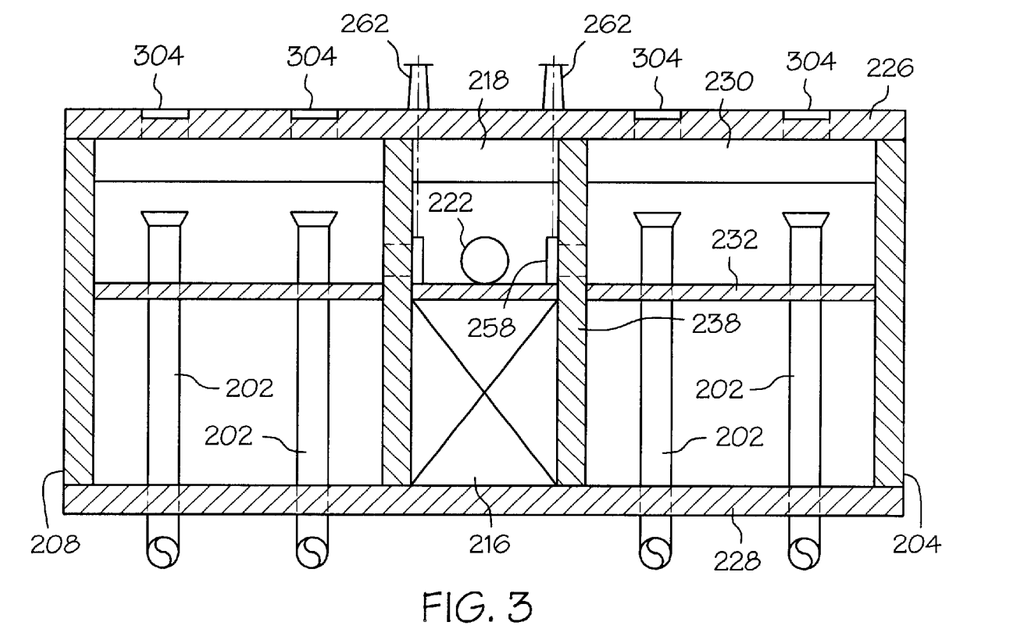
FIG. 3 is cross-sectional view taken along the line 3—3 of FIG. 1.
Figure 4:
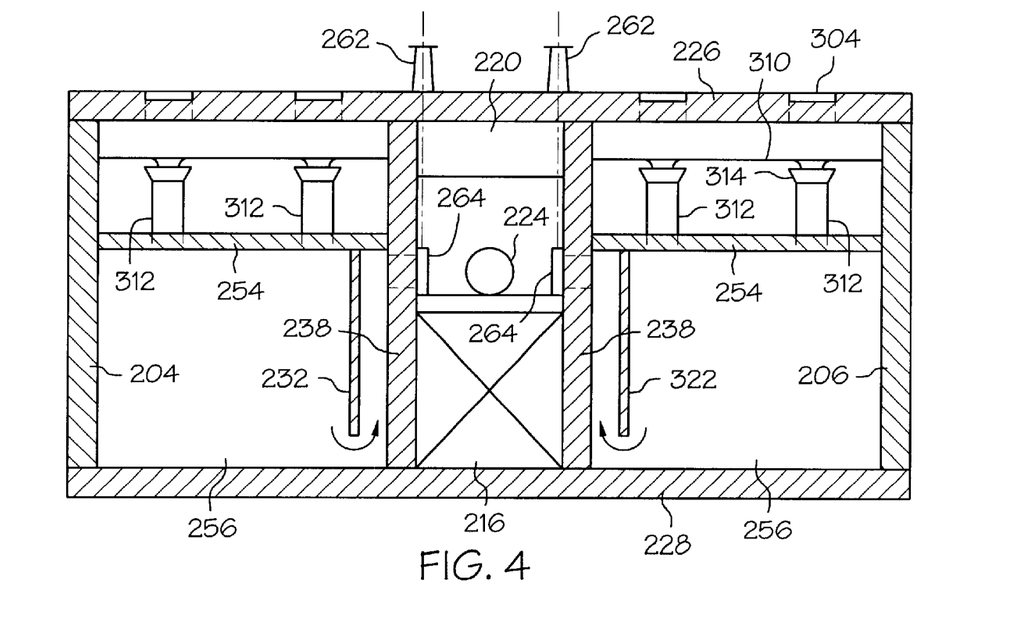
FIG. 4 is a cross-sectional view taken along the line 4—4 of FIG. 1.

Referring now to FIG. 2, which is a cross-sectional view through vessel 200, first contactor 212 includes a top wall 226 and a bottom wall 228 to define a closed vessel. Cell 212 includes a closed inlet channel 230 for untreated water. Inlet channel 230 has a predetermined depth below cell top wall 226, as defined by channel bottom wall 232. Immediately adjacent inlet channel 230 is a first diffusion cell or ozone reaction cell 234 that is separated from inlet channel 230 by vertical wall 236 that extends laterally across contactor 212. First ozone reaction cell 234 is defined by wall 236, cell side walls 204 and 238 (see FIG. 1), cell bottom wall 228, and primary baffle member 240, which extends upwardly from cell bottom wall 228 and terminates at upper edge 242, which is spaced from top wall 226 to define a weir over which the water undergoing treatment passes.

A second diffusion cell or ozone reaction cell 244 is adjacent first ozone reaction cell 234 and is separated therefrom by primary baffle member 240. Second ozone reaction cell 244 is defined by primary baffle member 240, cell side walls 204, 238, cell bottom wall 228, and a secondary baffle member 246, which extends laterally across contactor 212 from a point below cell top wall 226 to a point spaced above cell bottom wall 228 at a lower edge to define a submerged weir under which the water undergoing treatment passes.

A third diffusion cell or ozone reaction cell 250 is adjacent second ozone reaction cell 244 and is separated therefrom by secondary baffle member 246. Third ozone reaction cell 250 is defined by secondary baffle member 246, cell side walls 204, 238, cell bottom wall 228, and outlet cell wall 252, which extends laterally across contactor 212 from cell bottom wall 228 to a point spaced downwardly from cell top wall 226. A horizontal wall 254 extends generally horizontally from the upper end of outlet cell wall 252 to contactor end wall 210 to define an ozone quenching outlet cell 256. If desired, additional diffusion cells or ozone reaction cells, separated by suitable baffle members, can be provided to provide longer contact times for ozone disinfection applications.

In each instance, inlet channel 230, ozone reaction cells 234, 244, 250, and ozone quenching outlet cell 256 are shown as of generally rectangular form, although they can also be made in other forms, as desired. However, each of the component cells that together define first contactor 212 is sequentially arranged so that water can flow from one of the cells into an adjacent downstream cell based upon the depth of the water that is contained in the inlet channel and the rate of throughflow of water undergoing treatment.

Referring once again to FIG. 1, an inlet gate 258 is provided between inlet distribution channel 218 and inlet channel 230 of ozone contactor 212 to vary the open area of passageway 260 and thereby the flow into inlet channel 230. The operation of inlet gate 258 can be by any conventional means known to those having skill in the art, such as a gate operator shown generally in FIG. 3. Similarly, an outlet gate 264 is provided between outlet cell 256 and outlet collection channel 220, again, operable by a gate operator 262, to allow variation of the open area of passageway 266 and thereby enable control over the rate of flow of treated water from ozone quenching outlet cell 256 to outlet collection channel 220 and into vessel outlet pipe 224.

As best seen in FIG. 2, extending between inlet channel 230 and ozone reaction cell 234 is a vertically disposed downflow tube 202 that is formed in the shape of a "J." Downflow tube 202 includes a first vertical leg 268 having an outwardly flared inlet opening 270 that opens into inlet channel 230 at a point above channel bottom wall 232. A second vertical leg 272, shorter in axial length than first vertical leg 268, extends upwardly through cell bottom wall 228 and terminates at an outlet opening 274 at a point spaced above bottom wall 228. As shown in FIG. 2, each of vertical legs 268, 272 of downflow tube 202 extends below bottom wall 228 of contactor vessel 200 so that each of 90° curved elbow portions 276, 278 of downflow tube 202, that interconnect the respective vertical legs 268, 272 lie at a point below bottom wall 228. Downflow tube 202 must be so sized to maintain adequate downflow water velocities (2.5 to 6.0 fps) so that gas bubbles are entrained by the flowing water under stable, two-phase flow conditions without excessive head loss. A minimum of two downflow tubes 202 are preferably provided in ozone contactor 212 to provide good flow distribution across the width of contactor 212. In addition, if isolation valves (not shown) are installed in downflow tubes 202, one downflow tube can be shut down for inspecting an associated multi-stage diffuser assembly while the other tube can continue to operate at twice its normal water flow rate.

As represented by the dashed lines in FIG. 2, the overall length of downflow tube 202 can be changed, as desired, depending upon the desired hydraulic static pressure and the residence time of the ozone in the untreated water that passes through the downflow tube from inlet distribution channel 218 to first ozone reaction cell 234. The vertical length can be selected to enable the J-tube to be utilized in shallow contactors, as well as in retrofit applications in existing sedimentation basins, by adjusting the vertical length of the J-tube below contactor bottom wall 228 in order to provide sufficient static pressure in the water in the downflow tube (preferably from about 15 to about 30 feet) for achieving high ozone mass transfer rates. The J-tube piping arrangement, including the 180° long radius bend formed by elbows 276 and 278, also permits a cement-lining machine to be used to line the interior of the ductile iron piping and to maintain the cement lining over the operating life of the ozone contactor.

A stainless steel deflector plate 280 is positioned in spaced relationship from the outlet opening 274 of vertical leg 272 of downflow tube 202, to allow the distribution of outlet flow of water and entrained ozone bubbles in a lateral direction relative to the axis of opening 274. Such lateral flow distributes the ozone-containing water within the lower portion of cell 234 and thereby serves to minimize short-circuiting of the flow within the cell, to maximize the residence time of the outlet flow from downflow tube 202 within ozone reaction cell 234. As shown in FIG. 2, deflector plate 280, which preferably has a slightly larger diameter than that of outlet opening 274 in order to enhance lateral flow distribution, can be spaced from about 4 inches to about three feet above outlet opening 274 by means of a plurality of threaded connecting bolts 282 that serve as spacer rods. The proper spacing of deflector plate 280 from outlet opening 274 is a function of the design flow rate through the J-tube, and it should be selected to provide good lateral flow distribution, while at the same time minimizing excessive head losses across the outlet. In that regard, the spacing of deflector plate 280 from outlet opening 274 is preferably such as to provide a relatively high velocity to the water that exits from opening 274, of the order of from about 3 to about 6 fps, as the flow direction of the water changes from axial to lateral, relative to outlet opening 274. The structural arrangement of outlet opening 274 and deflector plate 280 will be further described hereinafter.

An ozone distributor 284 is shown generally within downflow tube 202 in FIG. 2. At least two closely-spaced, horizontally-disposed stages of porous diffuser elements, defining two ozone introduction zones, are preferred. The porous diffuser elements communicate with an ozone supply pipe 292 to provide a multiplicity of fine bubbles of ozone that are entrained within the water to be treated as the water flows through vertical leg 268.

Although the inlet portion of downflow tube 202 that is exposed to contact with ozone gas is preferably made from stainless steel, at a point below cell bottom wall 228 the downflow tube can be formed from less expensive ductile iron, but it must include an ozone-resistant lining, such as a cement lining, to prevent direct contact between the ozone and the ductile iron. Second vertical leg 272 of downflow tube 202 is also preferably made from stainless steel, because of the ozone-containing water that surrounds it.

Referring once again to FIG. 2, upper horizontal wall 254 of ozone quenching outlet cell 256 is at a level below the level 310 of the water within ozone reaction cell 250. An inlet conduit 312 extends upwardly from and is in communication with quenching outlet cell 256. Conduit 312 includes an outwardly flared open inlet end 314 that is positioned at an elevation to maintain operating water level 310 within ozone reaction cell 250. Within inlet conduit 312 a quenching chemical can be supplied to a suitable chemical distributor 318, such as a perforated pipe, for introducing ozone quenching chemicals into the water entering outlet cell 256 to eliminate residual ozone that may be present. Quenching chemicals, such as sulfur dioxide, sodium bisulfate, or hydrogen peroxide, can be introduced into the ozonated water through a perforated pipe diffuser (not shown) that can be suspended in conduit 312. The available contact time between the quenching chemicals and the water within cell 256 allows the completion of quenching or advanced oxidation process reactions before the treated water is discharged from vessel 200. In that regard, a downwardly extending wall 322 is provided within outlet cell 256 to increase the residence time of the water and to promote completion of the quenching reactions before discharge of the treated water.

Figure 5:
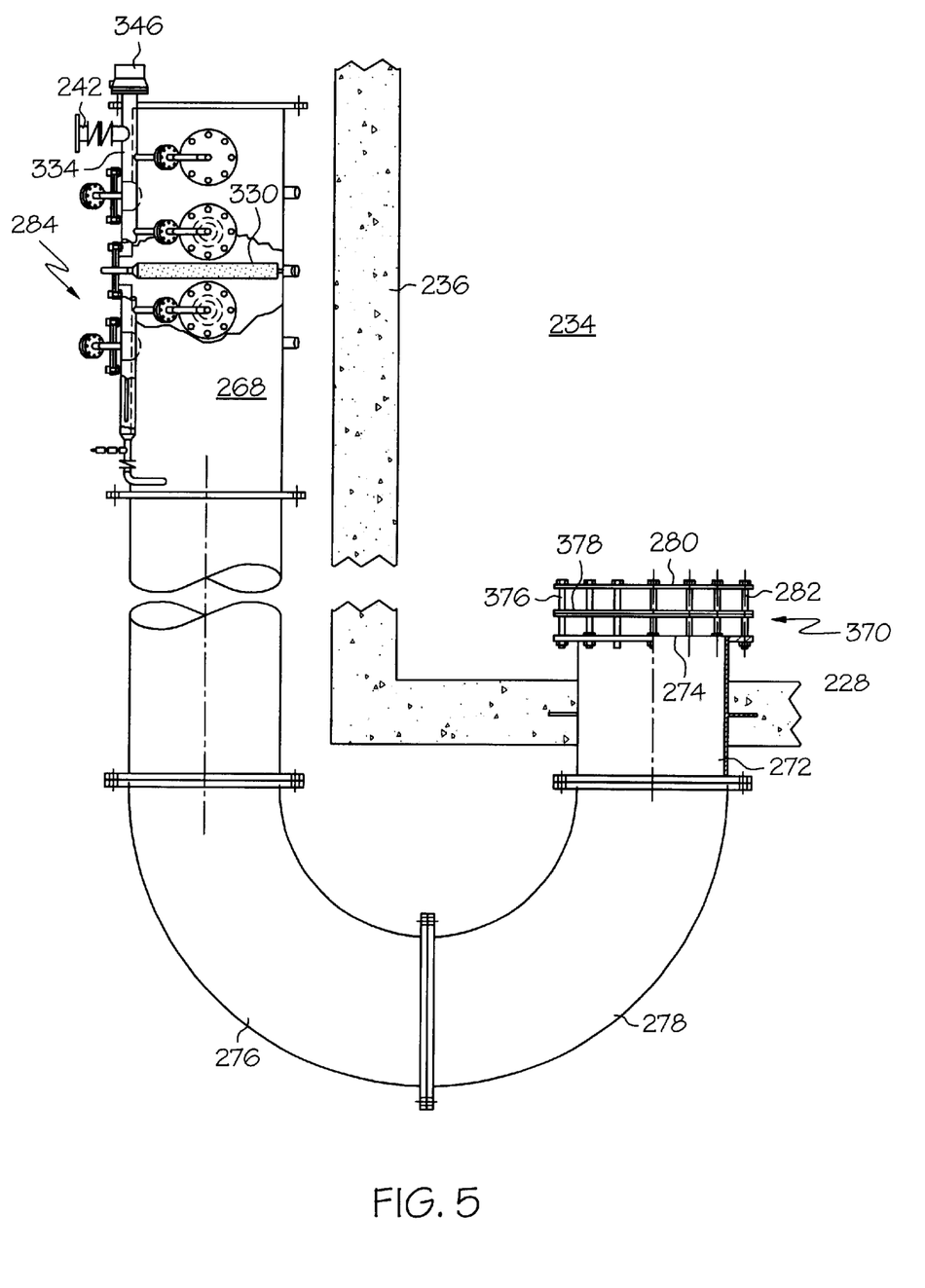
FIG. 5 is an enlarged, fragmentary, side elevational view of the J-tube ozone distributor shown in FIG. 2.

One possible configuration of downflow tube 202 and an associated diffuser assembly is shown in greater detail in FIG. 5. Vertical leg 268 carries multi-stage ozone diffuser assembly 284, which, as shown, is a three-stage diffuser assembly. Ozone assembly 284 includes three axially-spaced pairs of porous diffuser elements 330, each pair including rod-type, ceramic, diametrically-extending fine bubble diffuser elements that have their longitudinal axes offset 90° from each other, relative to the longitudinal axis of vertical leg 268. Each diffuser element 330 extends interiorly of and diametrically across vertical leg 268, and the respective diffuser elements of each stage are disposed in axially-spaced relationship along the longitudinal axis of leg 268. Further, diffuser elements 330 of each stage have their longitudinal axes offset by 90°, as best seen in FIG. 7, to provide a relatively uniform distribution of fine ozone bubbles over the entire cross-sectional area of leg 268.

Figure 6:
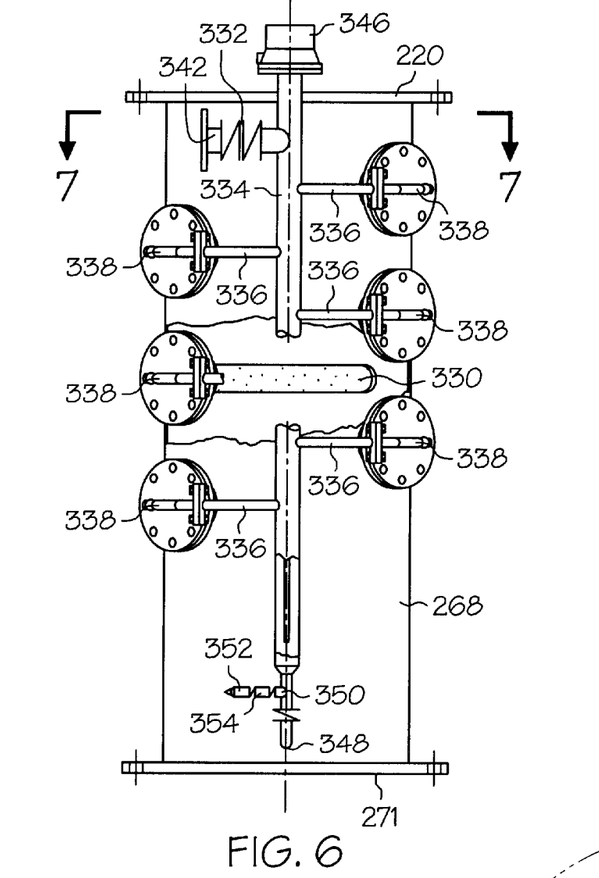
FIG. 6 is an enlarged, fragmentary view of the multi-stage ozone distributor shown in FIG. 5.
Figure 7:
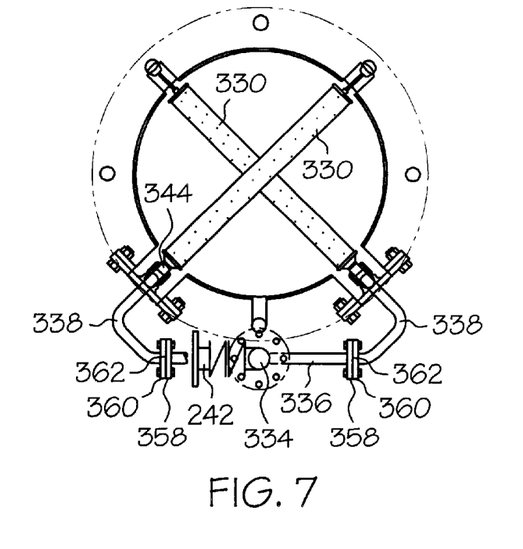
FIG. 7 is a cross-sectional view taken along the line 7—7 of FIG. 6.
Figure 8:
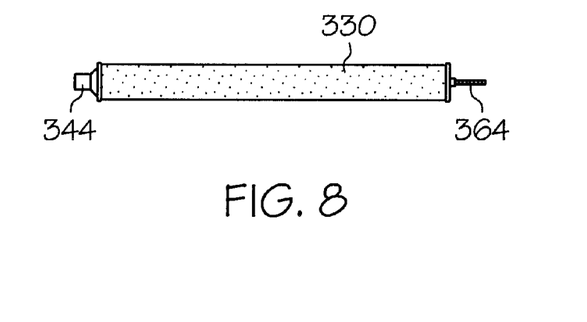
FIG. 8 is a side elevational view of a diffuser element.
Figure 9:
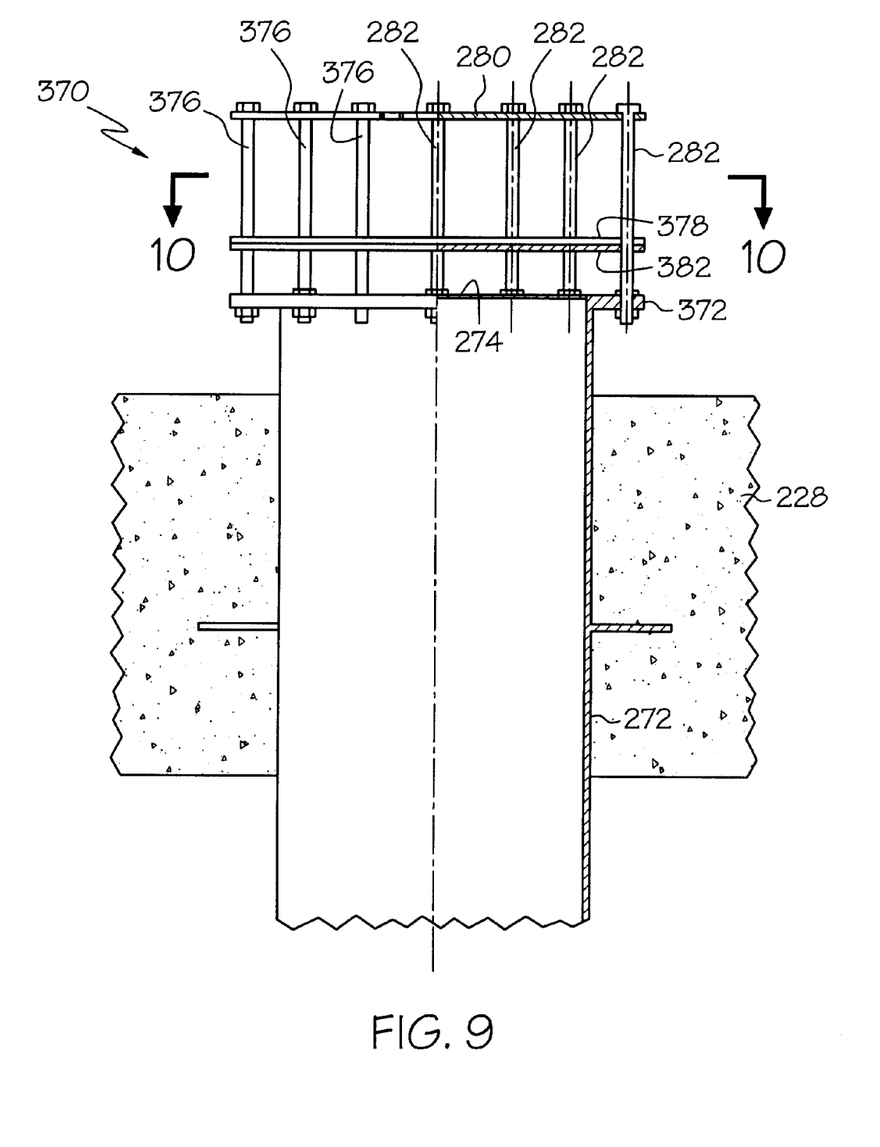
FIG. 9 is an enlarged, fragmentary view of the J-tube outlet and associated deflector and closure arrangement.
Figure 10:
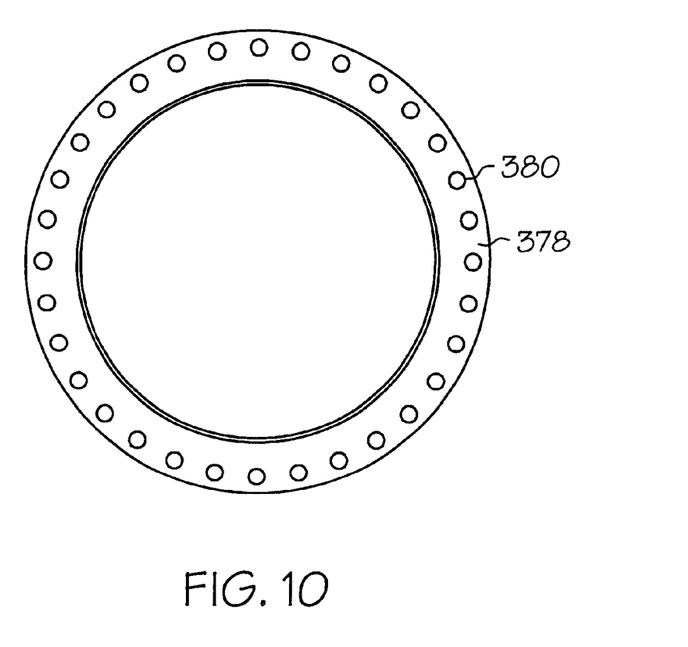
FIG. 10 is a cross-sectional view taken along the line 10—10 of FIG. 9.
Figure 11:
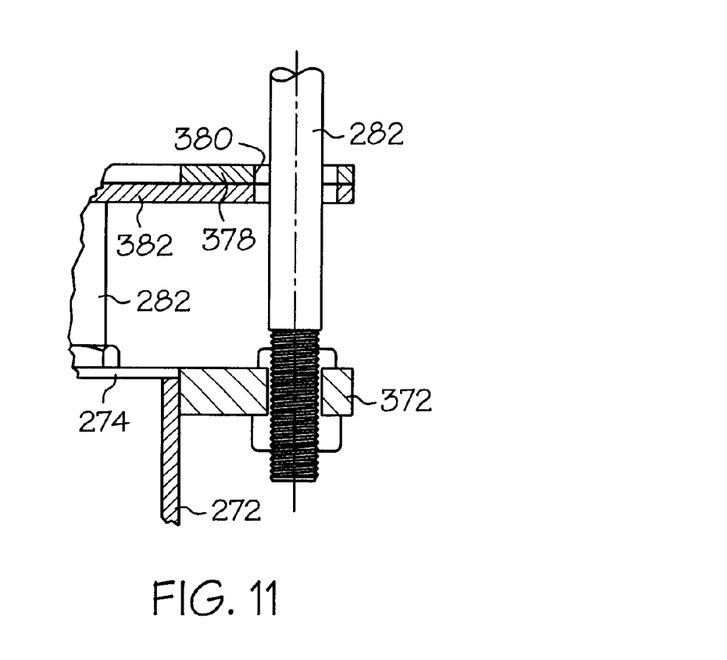
FIG. 11 is an enlarged, fragmentary elevational view showing the J-tube outlet flange and associated structure.
Figure 12:
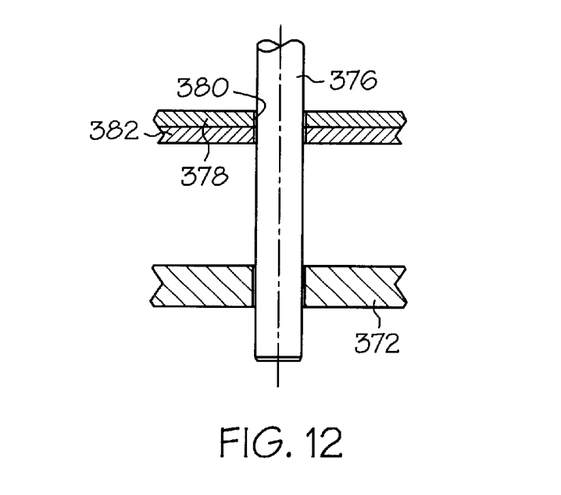
FIG. 12 is an enlarged, fragmentary elevational view of a seal plate guide rod and related structure.

The structure of multi-stage diffuser assembly 284 is shown in greater detail in FIGS. 6 through 8. Diffuser assembly 284 is carried in vertical leg 268, which serves as a downflow tube to convey water to be treated from inlet opening 270 to outlet opening 271, before the water enters the curved section defined by elbows 276 and 278 and before entry of the water and entrained ozone into first ozone reaction cell 234. An array of six diffuser elements 330 is provided in three stages of two diffuser elements each, wherein the individual diffuser elements 330 and the adjacent diffuser stages are each spaced about six inches or so from each other in the longitudinal direction of vertical leg 268. Ozone gas is supplied from a source (not shown) to ozone supply pipe 292. A check valve 332 is provided in pipe 292 to prevent backflow of water into the gas supply line. Ozone supply pipe 292 is connected to an ozone gas supply manifold 334 in the form of a vertically-disposed pipe that is carried exteriorly of vertical leg 268 and substantially parallel thereto. Six ozone feeder pipes 336 extend laterally outwardly of manifold 334 to supply ozone gas to each of respective diffuser elements 330. Feeder pipes 336 communicate with respective ozone conduits 338 that are connected to respective blind flanges 340 that are bolted to respective annular mounting flanges 342 carried on the outer surface of vertical leg 268. Conduits 338 are connected with respective gas inlet sleeves 344 (see FIGS. 7 and 8) carried by diffuser elements 330 to convey ozone gas into the interior of the diffuser elements, from which the ozone gas issues through the pores that are provided in diffuser elements 330 to provide ozone bubbles in the water flowing through the downflow tube.

At its uppermost end ozone supply manifold 334 includes a water level transmitter 346 to sense and to provide a signal representative of the water level within manifold 334. At its lowermost end manifold 334 includes a water purge outlet 348, an upstream check valve 350, and a hose fitting 352 that includes a ball-type shutoff valve 354 and a check valve 356.

As best seen in FIG. 7, respective ozone feeder pipes 336 are connected with their associated ozone conduits 338 by a flanged connection. Between flanges 358 and 360 is positioned an orifice plate 362 for regulating the ozone gas flow rate from supply manifold 334 to the respective diffuser elements 330. The orifice openings in each of orifice plates 362 are of different areas, based upon the elevation of the respective ozone feeder pipes 336 and the back pressure imposed by the height of the water within vertical leg 268. In that regard, the orifice openings increase in area from the uppermost ozone feeder pipe 336 to the lowermost pipe 336 in order to provide a substantially uniform ozone gas flow rate into each of respective diffuser elements 330, regardless of the elevation of the diffuser element within vertical leg 268.

A representative diffuser element 330 is shown in FIG. 8. Element 330 can be a rod-type, cylindrical, fine gas bubble ceramic diffuser that includes a gas inlet sleeve 344 at one end, to convey the ozone gas into the interior of the porous ceramic portion of the element, and an end pin 364 at the opposite end of the element. End pin 364 is received in a diffuser support cap 366 (see FIG. 7) that can be formed from an ozone-resistant material, such as Kynar®, a polyvinylidene fluoride material available from Atofina Chemicals Inc., of Philadelphia, Pa. Support caps 366 are received in respective end caps 368 provided in spaced, longitudinally aligned relationship relative to the longitudinal axis of vertical leg 268 and that are secured to the cylindrical wall in fluid-tight relationship.

In addition to a three-stage diffuser assembly, downflow tube 202 shown in FIG. 5 includes an outlet valve 370 between outlet opening 274 and deflector plate 280. Outlet valve 370 includes a closure member that serves to prevent backflow of water into downflow tube 202 upon shutdown of the associated contactor for cleaning or maintenance purposes. Deflector plate 280 is carried by outlet flange 272 and is maintained in fixed, spaced relationship relative to outlet opening 274 by a plurality of circularly-disposed, parallel connecting bolts 282. Between a number of adjacent connecting bolts 282 are guide rods 376 that are disposed parallel to connecting bolts 282 and are secured to deflector plate 280. Guide rods 376 and bolts 282 each extend from deflector plate 280 to outlet flange 372 and serve to slidably guide an annular seal carrier ring 378 for free sliding movement along the rods and bolts and between deflector plate 280 and outlet flange 372.

Seal carrier ring 378 is preferably made from an ozone-resistant material, such as Kynar®, and it includes a plurality of circularly-disposed openings 380 that correspond in size and location with guide rods 376 and connecting bolts 282. Ring 378 carries a plate member in the form of a flat, circular gasket 382 that is bonded to the lowermost surface of ring 378 to define the closure member. Gasket 382 has an area sufficient to completely overlie and to cover outlet opening 274 and is liquid-impervious to block backflow therethrough when gasket 382 is in its lowermost position and against outlet flange 372. Gasket 382 can advantageously be made from a polytetrafluoroethylene material, such as Gore-Tex®, which is available from W. L. Gore & Associates, Inc., of Newark, Del. If desired, outer plastic sleeves (not shown) can be provided on bolts 282 and guide rods 376 to reduce friction between the bolts, the rods, and the carrier ring to allow free movement of the carrier ring and attached gasket.

Figure 13:
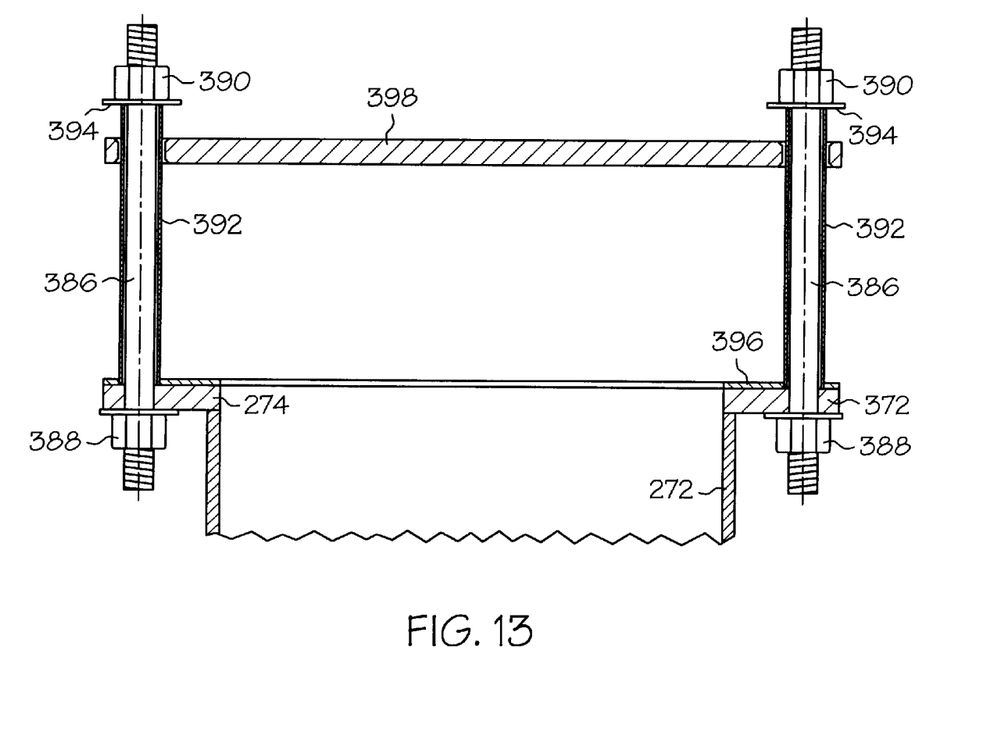
FIG. 13 is a fragmentary elevational view, partially in section, showing the seal plate in the open condition.

Another form of outlet vale structure is shown in FIG. 13. In that embodiment a movable, unitary seal plate 384 serves as a valve member when in a first position, and as a deflector plate when in a second position spaced from the first position. Flange 372 carries a plurality of axially-extending studs 386, only two of which are shown, that extend outwardly from opening 274 and that are threaded at each end to receive respective positioning nuts 388, 390. Studs 386 can be machined to a smooth finish, or, alternatively, a tubular sleeve 392 can be provided to surround each stud between its threaded ends and to extend from the annular outer surface of flange 372 to a point at which the stud contacts positioning nut 390. Sleeve 392 can have a radial flange 394 adjacent to nut 3990 to serve as a limit stop.

A flexible annular gasket 396 lies against the outer annular surface of flange 372 to form a gasket ring that surrounds opening 274. Gasket 396 can be formed from a chemically-resistant material such a polytetrafluoroethylene, or the like. Movable seal plate 384 is slidably carried on sleeves 392 for sliding movement therealong between flanges 394 and gasket 396.

When seal plate 384 is spaced from gasket 396 as a result of the outward force imposed by the flow of water from opening 274, it assumes a position such as is shown in FIG. 13. In that position seal plate 384 serves as a deflector plate to cause water flowing from opening 274 to turn 90° and to flow radially outwardly in all directions. When the flow of water through opening 274 is stopped, gravity causes seal plate 384 to descend against gasket 396 and thereby provide a seal therebetween to prevent backflow through opening 274. As will be appreciated, the disclosed seal plate arrangement does not require any mechanical activation, and it provides automatic closure of opening 274 when desired, which is when water is no longer being introduced through the inlet into downflow tube 202.

In operation, water to be treated enters contactor vessel 200 through inlet pipe 222 and flows into inlet distribution channel 218 positioned between the respective ozone contactors 212 and 214. The untreated inlet water then flows through the inlet gates 258 into the inlet channels 230 of the respective cells. When sufficient untreated water has entered the inlet channels it ultimately reaches a level higher than that of flared inlet opening 270 of downflow tube 202 and flows into the downflow tube. As the untreated water flows past ozone distributor 284, ozone gas from a source of gaseous ozone (not shown) is introduced into the water in fine bubble form through porous elements 290 that are part of the multi-stage ozone distributor. Because the velocity of the water flowing within downflow tube 202 and past ozone distributor 284 is sufficiently high, the entrained ozone bubbles are carried downwardly along downflow tube 202 by the water as it travels along first vertical leg 262 of the downflow tube, around the respective elbow portions 276 and 278 of the downflow tube, upwardly along second vertical leg 272 of the downflow tube, and out outlet opening 274. Deflector plate 280 causes the outflow from downflow tube 202 to spread laterally outwardly in a radial direction relative to the axis of outlet opening 274 to thereby distribute the water and entrained ozone laterally within and across the lowermost portion of reaction cell 234.

The water and entrained ozone then flow upwardly within first reaction cell 234, during which time the ozone gas serves to disinfect the water. Water with entrained ozone then spills over upper edge 242 of primary baffle member 240 and into second ozone reaction cell 244, where continued contact is effected between the ozone and constituents in the water. Thereafter, the flow of water with some still-entrained ozone continues in a downward direction within second ozone reaction cell 244 toward the base of contactor 212, around lowermost edge 248 of secondary baffle member 246, and into third ozone reaction cell 250 where continued interaction of the ozone and any remaining constituents in the water takes place. Any ozone gas that is liberated from the water as it passes within and between the several cells escapes from vessel 200 through an off-gas outlet pipe 320 that passes through top wall 220 of vessel 200 for subsequent collection.

Water with some remaining entrained ozone mixes within third ozone reaction cell 250 and ultimately flows from the third ozone reaction cell into inlet opening 314 of inlet conduit 312. Positioned within inlet conduit 312 is quenching chemical supply distributor 318, by means of which the ozone-quenching chemicals are introduced into the water entering outlet cell 256 in order to react with and to eliminate any remaining free ozone. The so-treated water then enters ozone quenching outlet cell 256 to continue to mix with the quenching chemicals, and it then enters outlet collection channel 220 to flow from vessel 200 through outlet pipe 224.

During operation of the system, the superficial velocity of the water should be greater than about 2.5 fps. to entrain gas bubbles with the downward flow stream, but it should preferably not exceed 6.0 fps in order to avoid bubble coring and excessive hydraulic head losses. Therefore, a 3:1 flow turndown per downflow tube can be achieved. If two downflow tubes are provided in each diffusion chamber a 6:1 flow turndown can be achieved, provided that a single tube is employed at low water flow rates.

The overall performance of the diffusers can be determined without opening the downflow tube by monitoring a pressure gauge that can be positioned at the top of the ozone distribution conduit. Increasing pressure readings in the distribution conduit at a given gas flow rate indicate a clogged diffuser; whereas decreasing pressure readings indicate leaky diffuser gaskets.

The confined head space at the top of the downflow tube provides ample space to entrap rising gas bubbles when flow to the downflow tube is stopped; the ozone off gas is easily removed by attaching a portable vacuum pump (not shown) to the sample tap located on the blind flange at the top of the tube.

The use of high ozone concentrations in the feed gas coupled with low ozone demand can lead to very low gas flow rates delivered to the contactor. If the contactor diffusion chamber is not properly designed, low gas flow rates can result in inadequate gas-liquid mixing and ineffective disinfection. The present invention resolves that problem by confining ozone gas flows to the relatively small water column formed within the downflow tube. By doing so, turbulent and uniform mixing conditions can be maintained in the downflow tube for effective disinfection of water.

A multistage diffuser arrangement as herein described permits much wider operating ranges for an ozone contactor vessel. In that regard, the ozone introduction system can respond effectively to sudden changes in plant flow rates or to water quality changes, while maintaining fine gas bubble sizes and high ozone mass transfer rates. Additional operational features and details relating to downflow-type disinfection reactors incorporating fine bubble diffusers for ozone disinfection of water are provided in U.S. Pat. No. 6,001,247, entitled "Removable, In-line diffuser Apparatus for Ozone Disinfection of Water," which issued on Dec. 14, 1999, to Christopher R. Schulz, the entire disclosure of which is hereby incorporated by reference to the same extent as if fully rewritten.

As will be apparent to those skilled in the art, the J-tube embodiment of the present invention provides a number of beneficial results, including lower capital costs by eliminating booster pumping and associated piping, by reducing the number of fine-bubble diffusers, by eliminating a large horizontal diffuser piping grid, and by enabling the use of cement-lined ductile iron piping in lieu of stainless steel for the J-tube. Additionally, the J-tube arrangement can be used in conjunction with shallow-depth ozone contactor vessels, either to retrofit them or to reduce initial construction costs for dewatering, for rock excavation, or for multiple-lift concrete pours, without compromising ozone mass transfer rates. Moreover, the J-tube arrangement can be used in conjunction with deep contactor vessels to minimize the overall contactor footprint, to reduce land costs, or to accommodate particular site constraints, without increasing the back pressure on the ozone generators and without compromising the energy efficiency for ozone production.

In addition to reduced construction costs, operating costs using the J-tube arrangement are lower because higher ozone concentrations (up to 16% by weight is possible with new ozone generator technologies) can be used to reduce oxygen consumption without compromising gas-liquid mixing efficiency in the contactor. And maintenance costs are lower because the multi-stage diffuser assembly only requires a small number of high-capacity, rod-type diffusers and associated gaskets that need to be inspected or replaced periodically, as compared with hundreds of diffusers for conventional fine bubble diffuser contactors.

From the standpoint of performance, the J-tube arrangement provides improved mass transfer rates by utilizing increased hydrostatic pressures (25 to 30 ft.) and aggressive gas/liquid mixing in the vertical downflow tube arrangement. The vertical configuration of the multi-stage diffuser assembly provides a flow operating range 200 to 300 percent higher than existing single-stage fine bubble diffusion ozone dissolution methods, which allows greater operational flexibility for plants with wide water flow or ozone dose variations. Additionally, a maximum ozone residual is developed in the downflow tube within a few seconds, which in turn maximizes CT exposure in the contactor (including the first cell) for disinfection applications. And ozone residuals measured at the downflow tube outlet are relatively stable, which simplifies on-line monitoring and control of the ozonation system.

From a maintenance standpoint, the multi-stage diffuser assembly can be easily removed from the downflow tube for inspecting and maintaining or replacing the fine-bubble diffusers and gaskets. Additionally, the diffuser assembly can be accessed without dewatering the inlet distribution channel or ozone contactor.

Although particular embodiments of the present invention have been illustrated and described, it will be apparent to those skilled in the art that various changes and modifications can be made without departing from the spirit of the present invention. For example, although illustrated and described in the context of a disinfection system utilizing porous diffuser elements to introduce the gaseous ozone into the water to be treated, the invention can also be utilized in direct injection systems, such as by venturi injection. Accordingly, it is intended to encompass within the appended claims all such changes and modifications that fall within the scope of the present invention.

What is claimed is:

1. Apparatus for introducing ozone into water for treatment for disinfection or oxidation purposes, said apparatus comprising:
   a. a contactor vessel for receiving water to be treated, the vessel including a water inlet conduit for introducing untreated water into the vessel and a water outlet conduit for withdrawing treated water from the vessel;
   b. at least one diffusion chamber within the contactor vessel and within which ozone is introduced into water to be treated, the diffusion chamber containing water;
   c. at least one downflow tube having a longitudinal axis and positioned substantially vertically within the at least one diffusion chamber, the downflow tube including a water inlet and a water outlet, wherein the downflow tube is J-shaped, having a first vertical leg including the downflow tube water inlet and a second vertical leg of shorter length than the first vertical leg, the second vertical leg including the downflow tube water outlet, and wherein the first and second vertical legs are interconnected by at least one curved tubular connector portion to enable water to flow into the first vertical leg and to flow out of the second vertical leg, and wherein the downflow tube water outlet is spaced from and is positioned below the downflow tube water inlet;
   d. an ozone distributor positioned within the at least one downflow tube between the downflow tube water inlet and the downflow tube water outlet, the ozone distributor including a plurality of elements in communication with a source of ozone for introducing ozone into the downflow tube;
   e. a deflector spaced from the downflow tube water outlet to deflect and laterally disperse outlet flow from the downflow tube; and
   f. a check valve positioned at the downflow tube water outlet for closing the outlet opening and preventing backflow of water into the outlet opening upon cessation of flow of untreated water into the downflow tube inlet, wherein the check valve includes an axially slidable closure member movable between a first position spaced from the downflow tube water outlet to allow flow therethrough, and a second position at which the closure member overlies and blocks flow through the downflow tube water outlet.

2. Apparatus in accordance with claim 1, wherein the deflector is a substantially horizontal plate.

3. Apparatus in accordance with claim 2, wherein the deflector is carried by the downflow tube.

4. Apparatus in accordance with claim 1, wherein the closure member includes an annular ring and a plate member secured to the ring and positioned to face that downflow tube water outlet.

5. Apparatus in accordance with claim 4, wherein the plate member is a polymeric material.

6. Apparatus in accordance with claim 1, wherein the ozone distributor elements are porous elements that extend transversely within the at least one downflow tube.

7. Apparatus for introducing ozone into water for treatment for disinfection or oxidation purposes, said apparatus comprising:
   a. a contactor vessel for receiving water to be treated, the vessel including a water inlet conduit for introducing untreated water into the vessel and a water outlet conduit for withdrawing treated water from the vessel;
   b. at least one diffusion chamber within the contactor vessel and within which ozone is introduced into water to be treated, the diffusion chamber containing water;
   c. at least one downflow tube having a longitudinal axis and positioned substantially vertically within the at least one diffusion chamber, the downflow tube including a water inlet and a water outlet, wherein the downflow tube water outlet is spaced from and is positioned below the downflow tube water inlet;
   d. an ozone distributor positioned within the at least one downflow tube between the downflow tube water inlet and the downflow tube water outlet, the ozone distributor including a plurality of elements in communication with a source of ozone for introducing ozone into the downflow tube; and
   e. a check valve positioned at the downflow tube water outlet for closing the outlet opening and preventing backflow of water into the outlet opening upon cessation of flow of untreated water into the downflow tube inlet, wherein the check valve includes a plate member that is axially movable toward and away from the downflow tube water outlet and that has an area sufficient to completely cover and seal the outlet opening when the plate member is in contact with the outlet opening.

8. Apparatus in accordance with claim 7, wherein the plate member is slidable supported on guide rods carried by the downflow tube and that extend in an axial direction relative to the downflow tube outlet opening.

9. Apparatus in accordance with claim 8, wherein the guide rods includes stops spaced outwardly from the outlet opening to limit axial outward movement of the plate member relative to the outlet opening.

10. Apparatus in accordance with claim 9, wherein the outlet opening faces in an upward direction and movement of the plate member toward the outlet opening is induced by gravity acting on the plate member when water flow through the outlet opening is substantially terminated.

11. Apparatus for introducing ozone into water for treatment for disinfection or oxidation purposes, said apparatus comprising:
   a. a contactor vessel for receiving water to be treated, the vessel including a water inlet conduit for introducing untreated water into the vessel and a water outlet conduit for withdrawing treated water from the vessel;
   b. at least one diffusion chamber within the contactor vessel and within which ozone is introduced Into water to be treated, the diffusion chamber containing water,
   c. at least one downflow tube having a longitudinal axis and positioned substantially vertically relative to the at least one diffusion chamber, the downflow tube including a water inlet and a water outlet, wherein the downflow tube is J-shaped, having a first vertical leg including the downflow tube water inlet and a second veil leg of shorter length than the first vertical leg, the second vertical leg including the downflow tube water outlet, and wherein the first and second vertical legs are interconnected by at least one curved tubular connector portion to enable water to flow into the first vertical leg and to flow out of the second vertical leg, and wherein the downflow tube water outlet is spaced below the downflow tube water inlet and is positioned to discharge water into the at least one diffusion chamber;
   d. an ozone distributor in communication with the at least one downflow tube between the downflow tube water inlet and the downflow tube water outlet, wherein the ozone distributor is in communication with a source of ozone for introducing ozone into the downflow tube;
   e. a deflector spaced from the downflow tube water outlet to deflect and laterally disperse outlet flow from the downflow tube; and
   f. a check valve positioned at the downflow tube water outlet for closing the outlet opening and preventing backflow of water into the outlet opening upon cessation of flow of untreated water into the downflow tube inlet, wherein the check valve includes an axially slidable closure member movable between a first position spaced from the downflow tube water outlet to allow flow therethrough, and a second position at which the closure member overlies and blocks flow through the downflow tube water outlet.

12. Apparatus in accordance with claim 11, wherein the ozone distributor includes a plurality of ozone distribution elements.

13. Apparatus in accordance with claim 11, wherein the ozone distributor includes a plurality of ventures.

14. Apparatus in accordance with claim 11, wherein the at least one downflow tube is positioned within the at least one diffusion chamber.

* * * * *